United States Patent
Iijima

(10) Patent No.: US 10,025,296 B2
(45) Date of Patent: Jul. 17, 2018

(54) SERVO CONTROL APPARATUS HAVING FUNCTION OF OBTAINING FREQUENCY CHARACTERISTICS OF MACHINE ON LINE

(71) Applicant: FANUC CORPORATION, Yamanashi (JP)

(72) Inventor: Kazunori Iijima, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 266 days.

(21) Appl. No.: 15/136,867

(22) Filed: Apr. 22, 2016

(65) Prior Publication Data
US 2016/0313726 A1    Oct. 27, 2016

(30) Foreign Application Priority Data
Apr. 24, 2015 (JP) ................. 2015-089404

(51) Int. Cl.
*G05B 19/416* (2006.01)
(52) U.S. Cl.
CPC .. *G05B 19/416* (2013.01); *G05B 2219/37347* (2013.01); *G05B 2219/41112* (2013.01)
(58) Field of Classification Search
None
See application file for complete search history.

(56) References Cited

U.S. PATENT DOCUMENTS

| 4,868,487 A | 9/1989 | Ryder |
| 2016/0070252 A1* | 3/2016 | Imada .................. H02P 29/00 318/561 |

(Continued)

FOREIGN PATENT DOCUMENTS

| CN | 101463847 A | 6/2009 |
| CN | 101806833 A | 8/2010 |

(Continued)

OTHER PUBLICATIONS

"The Frequency Characteristic Analyzer FRA Idea and Technology Which Could Be Realized Ecause It Was NF Who Knew Negative Feedback", NF winds vol. 20, 2006, https://www.nfoorp.co.jp/winds/pdf/20_fra.pdf, retrieved from Internet, 5 pp.

(Continued)

*Primary Examiner* — Dennis M Butler
(74) *Attorney, Agent, or Firm* — Hauptman Ham, LLP

(57) ABSTRACT

A servo control apparatus according to the present invention includes a speed command generator; a torque command generator; a speed detector for detecting the speed of a servomotor; a speed control loop including the speed command generator, the torque command generator, and the speed detector; a sinusoidal sweep input unit for performing a sinusoidal sweep on the speed control loop; and a frequency characteristics calculator for estimating the gain and phase of speed control loop input and output signals from the output of the speed control loop when a sinusoidal disturbance is inputted thereto. The frequency characteristics calculator expresses the output of the speed control loop as the Fourier series having an arbitrary number of terms using a disturbance input frequency as a fundamental frequency, and calculates the amplitude and phase of a fundamental component of the Fourier series in order to calculate frequency characteristics on line.

2 Claims, 4 Drawing Sheets

(56) References Cited

U.S. PATENT DOCUMENTS

2016/0123796 A1* 5/2016 Nagaoka ............ G05B 19/4062
702/56
2016/0315574 A1* 10/2016 Kawashima ......... H02K 41/031

FOREIGN PATENT DOCUMENTS

| | | | |
|---|---|---|---|
| CN | 102608420 | A | 7/2012 |
| JP | 59-226907 | A | 12/1984 |
| JP | 10-282162 | A | 10/1998 |
| JP | 11-326411 | A | 11/1999 |
| JP | 2000-278990 | A | 10/2000 |
| JP | 2003-85905 | A | 3/2003 |
| JP | 2004-15789 | A | 1/2004 |
| JP | 2004-20522 | A | 1/2004 |
| JP | 2005-78559 | A | 3/2005 |
| JP | 3626858 | B2 | 3/2005 |
| JP | 2009-282609 | A | 12/2009 |
| JP | 2010-123018 | A | 6/2010 |
| JP | 5302639 | B2 | 10/2013 |
| JP | 2014-60495 | A | 4/2014 |

OTHER PUBLICATIONS

Shuichi Adachi, "System Identification for Control by MATLAB", Tokyo Denki University Press, Nov. 30, 1996, pp. 88-114 and pp. 69-88.

Shuichi Adachi, "System Identification for Control by MATLAB", Tokyo Denki University Press, Nov. 30, 1996, pp. 89-114.

Shuichi Adachi, "System Identification for Control by MATLAB", Tokyo Denki University Press, Nov. 30, 1996, pp. 89-114 and pp. 115-151.

* cited by examiner

SERVO CONTROL APPARATUS HAVING FUNCTION OF OBTAINING FREQUENCY CHARACTERISTICS OF MACHINE ON LINE

RELATED APPLICATIONS

The present application claims priority to Japanese Patent Application Number 2015-089404 filed Apr. 24, 2015, the disclosure of which is hereby incorporated by reference herein in its entirety.

BACKGROUND OF THE INVENTION

1. Field of the Invention

The present invention relates to a servo control apparatus, and specifically relates to a servo control apparatus having a function of obtaining a frequency response of a control system on line using the Fourier series.

2. Description of Related Art

A lot of apparatuses and methods related to the measurement of the frequency characteristics of a control system of a servo control apparatus have been proposed and widely used in measuring the transmission characteristics of a feed axis of a machine tool. Generally speaking, while a vibrator forcefully applies a vibration to an analysis object (while applying a frequency sweep), a response vibration is measured. After time series data thereof is logged into mass storage, a frequency transfer function is obtained using various signal processing techniques. In simplified measurements, an actuator itself is used as the vibrator, and a response vibration thereto is measured, logged, and subjected to signal processing. In electric circuits and optical systems, a vibrator circuit is used.

A technology for understanding the resonance characteristics of an object by logging and analyzing time series data has been actively developed (for example, "System Identification for Control by MATLAB", written by Shuichi Adachi, published in 1996 by Tokyo Denki University Press, pp. 69-88, hereinafter referred to as "non-patent literature 1"). As described in the non-patent literature 1, the above method for calculating a frequency response belongs to "non-parametric identification" that is premised on the Fourier transform of the time series data. As a method for "parametric identification" referred to as online estimation (sequential estimation), there is a normalized gradient method, which is easily realized using a DSP (digital signal processor) (for example, "System Identification for Control by MATLAB", written by Shuichi Adachi, published in 1996 by Tokyo Denki University Press, pp. 89-114 and pp. 115-151). These methods basically aim to obtain the frequency characteristics in the course of or as a result of fitting to a linear regression model.

A non-parametric measurement method of the frequency characteristics applied to a general closed loop control and a simplified measurement method that eliminates the need for providing a spectrum analyzer are known (for example, Japanese Unexamined Patent Publication (Kokai) No. 59-226907, hereinafter referred to as "patent literature 1"). As described in the patent literature 1, conventional measurement methods of the frequency characteristics use the Fourier transform by a spectrum analyzer.

There is also known an application in which the measurement of the frequency characteristics using the Fourier transform is used for a machine tool (for example, Japanese Patent No. 5302639, hereinafter referred to as "patent literature 2"). The patent literature 2 describes a machine tool control apparatus that regulates a compensation circuit based on the calculation of the frequency characteristics by a sinusoidal sweep method. The frequency characteristics are calculated before the machine tool is actually operated (refer to paragraph [0031] of patent literature 2).

There are proposed methods that do not use the Fourier transform (for example, Japanese Unexamined Patent Publication (Kokai) Nos. 2004-020522 and 11-326411, hereinafter referred to as "patent literature 3" and "patent literature 4", respectively). In these methods, the time difference between input and output signals is directly measured to obtain a phase delay. The patent literature 3 discloses a measurement method for calculating the frequency characteristics by direct current detection of an output and zero-crossing detection when analyzing the output signal of a transmission path relative to a sinusoidal wave input, and a method for obtaining a phase using a time measurement module (TMS). The patent literature 4 discloses a frequency characteristics measurement device that calculates the frequency characteristics in a sequential manner by a sequence control. In frequency switching, waiting time is provided for data sampling, using measurement parameters including a group delay time and an allowance.

A method for obtaining a frequency transfer function by making complex Fourier coefficients into vectors is proposed (for example, Japanese Patent No. 3626858, hereinafter referred to as "patent literature 5"). This method is meaningful in terms of enabling analyses of a vibration containing harmonics. The patent literature 5 discloses that complex Fourier coefficients of an observation vibration containing harmonics are calculated at a vibration axis in a multi-axis vibration table and the transfer function of the vibration table is estimated from the vectors of the Fourier coefficients, and a vibration analysis method in a case where an actuator applies a vibration to a system in which an accelerometer is attached to the vibration table. The invention described in the patent literature 5 originally relates to the vibration table system on which a specimen is mounted. The vibration table aims at testing the strength of the specimen, and a waveform distortion control device is a vibration reproduction device. The vibration table system is not a control system for positioning using an electric motor.

The use of the methods requiring the logging of the time series data, as described in the patent literatures 1 and 2, allows precise obtainment of the frequency characteristics using the Fourier transform. The fast Fourier transform is realized by a method referred to as a butterfly computation. A spectrum analyzer such as an oscilloscope is equipped with an adequate volatile memory area and a butterfly circuit. This enables the Fourier transform in real time with ease. However, the control period of digital servo control greatly depends on the PWM control period of a servo amplifier, which is a driver of a motor. Thus, the servo control period is determined under an operation speed constraint of a power device installed in the amplifier. Due to heat generation by the power device, the servo control period cannot be so short. Due to heat generation by a control DSP itself, a clock speed of the DSP cannot be so high. For these reasons, it is difficult to realize the fast Fourier transform in real time by only software installed for the servo control.

The methods that do not use the Fourier transform, as described in the patent literatures 3 and 4, allow the calculation of the frequency characteristics online in view of an amount of calculation and memory consumption. However, the methods that "directly" perform the zero-crossing detection and measure the delay time of the time series data cannot calculate the frequency characteristics with high precision. In the machine feed axis, a nonlinear vibration (so-referred to as self-excited chatter vibration and the like) often becomes conspicuous. In such a system, the frequency characteristics different from the actual resonance characteristics are obtained, owing to prominent integral multiple harmonics.

The patent literature 5 proposes a method for precisely calculating the frequency characteristics in a nonlinear system having such harmonics. The Fourier series, which does not obtain a continuous spectrum but obtains a discrete spectrum, is suitable for the calculation of the frequency characteristics online, because of the easy realization with a limitation on an arbitrary number of terms. However, the proposal described in the patent literature 5 relates to a method for configuring the device to determine the strength of an object, but does not relate to the structure and control for positioning a machine tool. The patent literature 5 just proposes a compensation element to reproduce a time series signal, but proposes neither a method for calculating the frequency characteristics nor a measurement method for essential control characteristics.

SUMMARY OF THE INVENTION

An object of the present invention is to provide a servo control apparatus that is capable of online measurement of the frequency characteristics of a feed axis with high precision in real time by a vibration test that is easily performable using a motor attached to the feed axis.

A servo control apparatus according to an embodiment of the present invention is a control apparatus for a machine tool having a feed axis driven by a servomotor. The servo control apparatus includes a speed command generator for generating a speed command value for the servomotor; a torque command generator for generating a torque command value for the servomotor; a speed detector for detecting the speed of the servomotor; a speed control loop including the speed command generator, the torque command generator, and the speed detector; a sinusoidal sweep input unit for performing a sinusoidal sweep on the speed control loop; and a frequency characteristics calculator for estimating the gain and phase of speed control loop input and output signals from the output of the speed control loop when a sinusoidal disturbance is inputted to the speed control loop. The frequency characteristics calculator expresses the output of the speed control loop as the Fourier series having an arbitrary number of terms using a disturbance input frequency from the sinusoidal sweep input unit as a fundamental frequency, and calculates the amplitude and phase of a fundamental component of the Fourier series in order to calculate the frequency characteristics online.

BRIEF DESCRIPTION OF THE DRAWINGS

The objects, features, and advantages of the present invention will be more apparent from the following description of an embodiment in conjunction with the attached drawings, wherein.

DETAILED DESCRIPTION OF THE INVENTION

Figure 1:
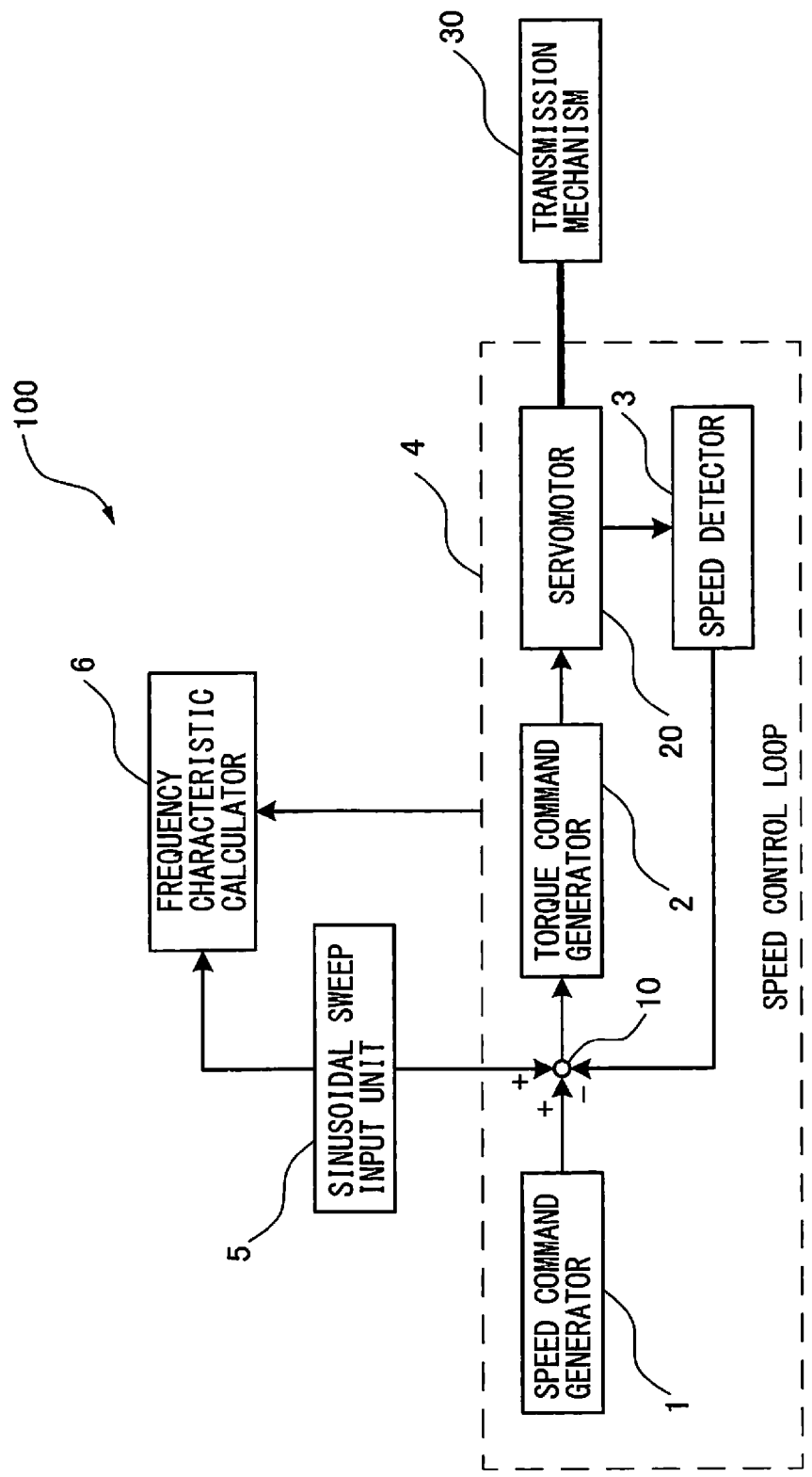
FIG. 1 is a block diagram showing the configuration of a servo control apparatus according to the embodiment of the present invention.

A servo control apparatus according to the present invention will be described below with reference to the drawings. FIG. 1 is a block diagram showing the configuration of a servo control apparatus according to an embodiment of the present invention. The servo control apparatus 100 according to the embodiment of the present invention is a control apparatus for a machine tool having a feed axis driven by a servomotor, and includes a speed command generator 1 for generating a speed command value for a servomotor 20; a torque command generator 2 for generating a torque command value for the servomotor 20; a speed detector 3 for detecting the speed of the servomotor 20; a speed control loop 4 constituted of the speed command generator 1, the torque command generator 2, and the speed detector 3; a sinusoidal sweep input unit 5 for performing a sinusoidal sweep on the speed control loop 4; and a frequency characteristics calculator 6 for estimating the gain and phase of speed control loop input and output signals from the output of the speed control loop 4 when a sinusoidal disturbance is inputted to the speed control loop 4 of the servo control apparatus 100. The frequency characteristics calculator 6 expresses the output of the speed control loop 4 as the Fourier series having an arbitrary number of terms using a disturbance input frequency from the sinusoidal sweep input unit 5 as a fundamental frequency, and calculates the amplitude and phase of a fundamental component of the Fourier series in order to calculate frequency characteristics online.

Next, the operation of the servo control apparatus according to the embodiment of the present invention will be described. First the speed command generator 1 generates the speed command value to drive the servomotor 20, and outputs the speed command value to an adder 10. The adder 10 adds the sinusoidal disturbance inputted from the sinusoidal sweep input unit 5 to the speed command value, subtracts a speed detection value of the servomotor 20 detected by the speed detector 3, and outputs a calculation result to the torque command generator 2.

The torque command generator 2 obtains the calculation result from the adder 10, and outputs a torque command to drive the servomotor 20. The servomotor 20 operates a driver (not shown) through a transmission mechanism 30.

The speed control loop 4 is constituted of the speed command generator 1, the torque command generator 2, and the speed detector 3.

The sinusoidal sweep input unit 5 performs the sinusoidal sweep on the speed control loop 4.

The frequency characteristics calculator 6 estimates the gain and phase of the speed control loop input and output signals from the output of the speed control loop 4 when the sinusoidal disturbance is inputted to the speed control loop 4 of the servo control apparatus 100. Furthermore, the frequency characteristics calculator 6 expresses the output of the speed control loop 4 as the Fourier series having an arbitrary number of terms using a disturbance input frequency from the sinusoidal sweep input unit 5 as a fundamental frequency, and calculates the amplitude and phase of a fundamental component of the Fourier series in order to calculate frequency characteristics online.

The servo control apparatus 100 according to the embodiment of the present invention has a loop configuration for speed control in its servo control system. In the speed control loop 4, the mechanical characteristics of the transmission mechanism 30 connected to the servomotor 20 are directly reflected.

Figure 2:
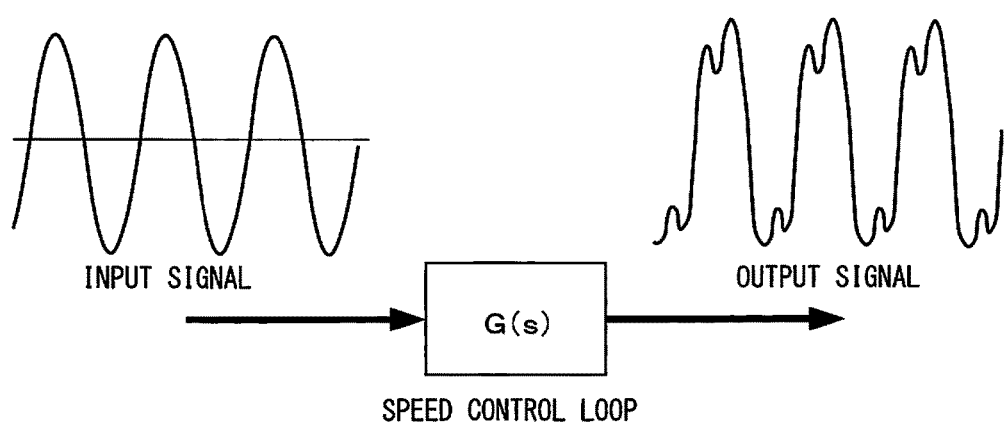
FIG. 2 is a drawing showing the waveforms of an input signal and an output signal of a speed control loop in the servo control apparatus according to the embodiment of the present invention.

When considering a method for calculating the frequency characteristics, the configuration of the speed control loop itself is not important, as long as a broken line portion of FIG. 1 is regarded as a system having one input-output relation. Thus, as shown in FIG. 2, only the corresponding relationship between an input signal and an output signal of the speed control loop is to be considered. When performing a frequency sweep, determining a steady-state response of the output signal, while a stepwise increase of the sinusoidal frequency of the input signal, serves to obtain the frequency characteristics.

When performing the frequency sweep, a slight transient response occurs when switching the frequency. Since the frequency characteristics are defined as "the input and output correspondence of a steady-state response when infinite time has elapsed", a steady state has been desirably established to calculate the frequency characteristics with high precision. To realize this, it is necessary "to continue inputting a sinusoidal wave of a constant frequency until a steady-state response is established" and "to verify the establishment of a steady state".

To verify the establishment of a steady-state response to a sinusoidal wave of a frequency F [Hz], it is rational to be determined by a convergence of vibrational energy to a constant value at a period of T=1/F [s]. In other words, when $E_1, E_2, \ldots, E_n$ represent the energy of an output signal v(t) at a first period, a second period, . . . , an n-th period, respectively, the following expressions must hold true in a stable control system.

$$\lim_{n \to \infty} \frac{E_n}{E_{n+1}} = 1$$

$$E_n \equiv \int_{t}^{t+nT} [v(t)]^2 \, dt$$

Wherein, T is a period.

Figure 3:
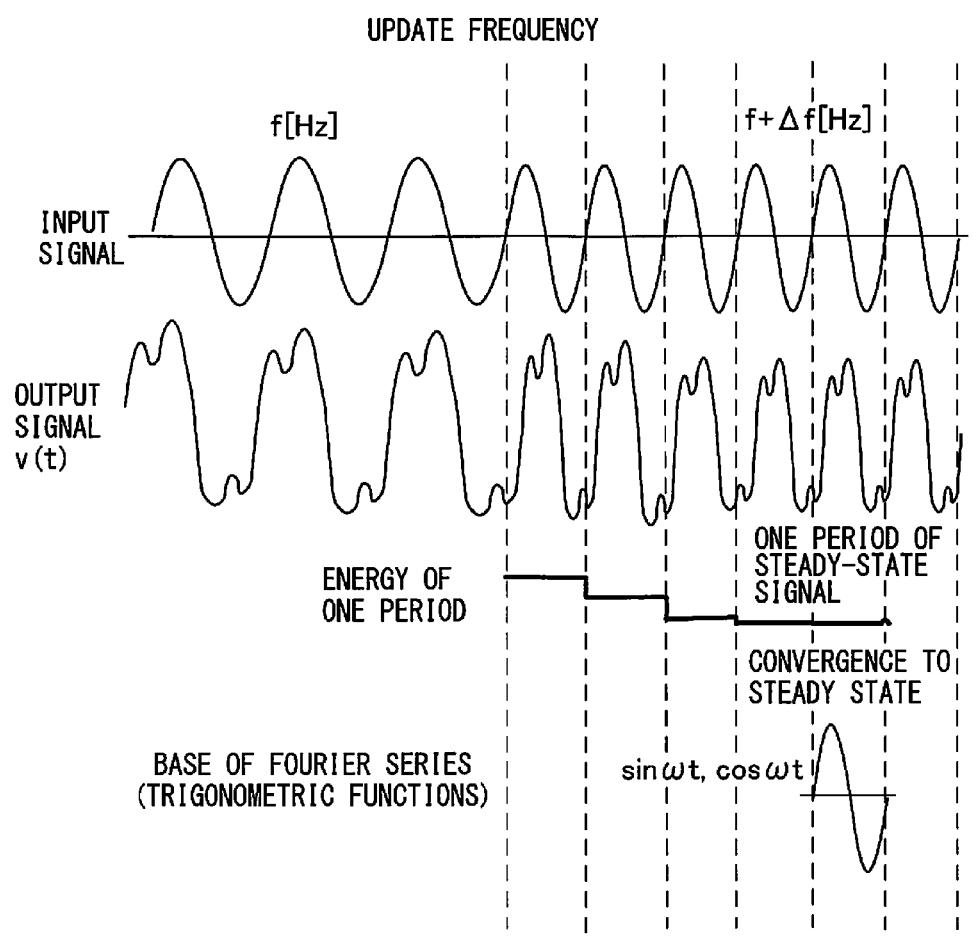
FIG. 3 is a drawing showing the waveforms of the input signal and the output signal of the speed control loop before and after updating a frequency, and an energy variation on a periodic basis in the servo control apparatus according to the embodiment of the present invention.

In essence, determining the convergence of a sequence $\{E_n\}$ allows the verification of the establishment of the steady-state response. As shown in FIG. 3, energy is calculated in each period, and it is regarded that a steady state has been established, when the ratio $E_n/E_{n+1}$ of the energy in the present period to that in the preceding period comes to 1. In this manner, the frequency characteristics calculator 6 preferably verifies the convergence of the output of the speed control loop 4 to the steady state by monitoring the energy of one period of the sinusoidal wave on a periodic basis. The sinusoidal sweep input unit 5 preferably continues inputting the sinusoidal wave of the constant frequency until the output of the speed control loop 4 reaches the steady state that is determined by the frequency characteristics calculator 6. In actuality, "a steady-state determination threshold value" may be defined within the order of $E_n/E_{n+1}=1\pm 0.05$ in consideration of variations in measurement points.

When the steady-state response has been verified to be established, only one period of v(t) is taken out and expanded into the Fourier series with the assumption that the one period repeats infinitely. The Fourier series is given as follows.

$$v(t) = V_0 + \sum_{n=1}^{\infty} (a_n \cos n\omega t + b_n \sin n\omega t)$$

$$a_n = \frac{2}{T} \int_0^T v(t) \cos n\omega t \, dt$$

$$b_n = \frac{2}{T} \int_0^T v(t) \sin n\omega t \, dt$$

$$V_0 = \frac{1}{T} \int_0^T v(t) \, dt$$

Wherein, ω [rad/sec] represents the angular frequency of a fundamental wave of the signal, $V_0$ represents a direct current component of the signal, T represents the period of the fundamental wave, and the others represent an n-th harmonic component. Coefficients $a_n$ and $b_n$ are obtained as the results of extraction of harmonic components that are equivalent to base signals cos(nωt) and sin(nωt) of the Fourier series, and represent the magnitude of a cosine component and a sine component of the corresponding harmonic component, respectively.

The Fourier coefficients $a_n$ and $b_n$ may be obtained by integrating a product of the output signal and a cosine wave, and a product of the output signal and a sine wave throughout one period, respectively. The integration throughout only a fixed period requires much less calculation than the Fourier transform, and therefore can be performed much more easily by a DSP online.

By calculating the Fourier series with an arbitrary number of terms N, whenever switching the frequency, the amplitude $c_1(\omega)$ and phase $\theta_1(\omega)$ of the fundamental wave are obtained as the frequency characteristics in the following form.

$$v(\omega; t) = V_0 + c_1(\omega)\sin(\omega t + \theta_1(\omega)) + \sum_{n=2}^{N} c_n(\omega)\sin(n\omega t + \theta_n(\omega))$$

Wherein, $c_n$ represents the amplitude of an n-th harmonic, and $\theta_n$ is the phase of the n-th harmonic.

The output signal manifests itself as a strain wave. Assuming that how close the strain wave is to a sinusoidal wave represents nonlinearity, the nonlinearity can be evaluated whenever switching the frequency on a frequency-by-frequency basis. In terms of a comparison between the fundamental wave and the harmonics, it is rational to use the following distortion factor from a physical viewpoint.

$$\text{distortion factor} = \frac{\text{root-mean-square of amplitude of harmonics}}{\text{amplitude of fundamental wave}} = \frac{\sqrt{\sum_{n=2}^{N} c_n^2}}{c_1}$$

As a method for evaluating the strain wave, a form factor or a crest factor may be used instead of the distortion factor. The frequency characteristics calculator 6 may express the output of the speed control loop 4 as the Fourier series having a harmonic component corresponding to the disturbance input frequency, and evaluate the nonlinearity of the control system by a characteristic that is the ratio of the contained harmonic component to the fundamental component, such as the distortion factor.

Figure 4:
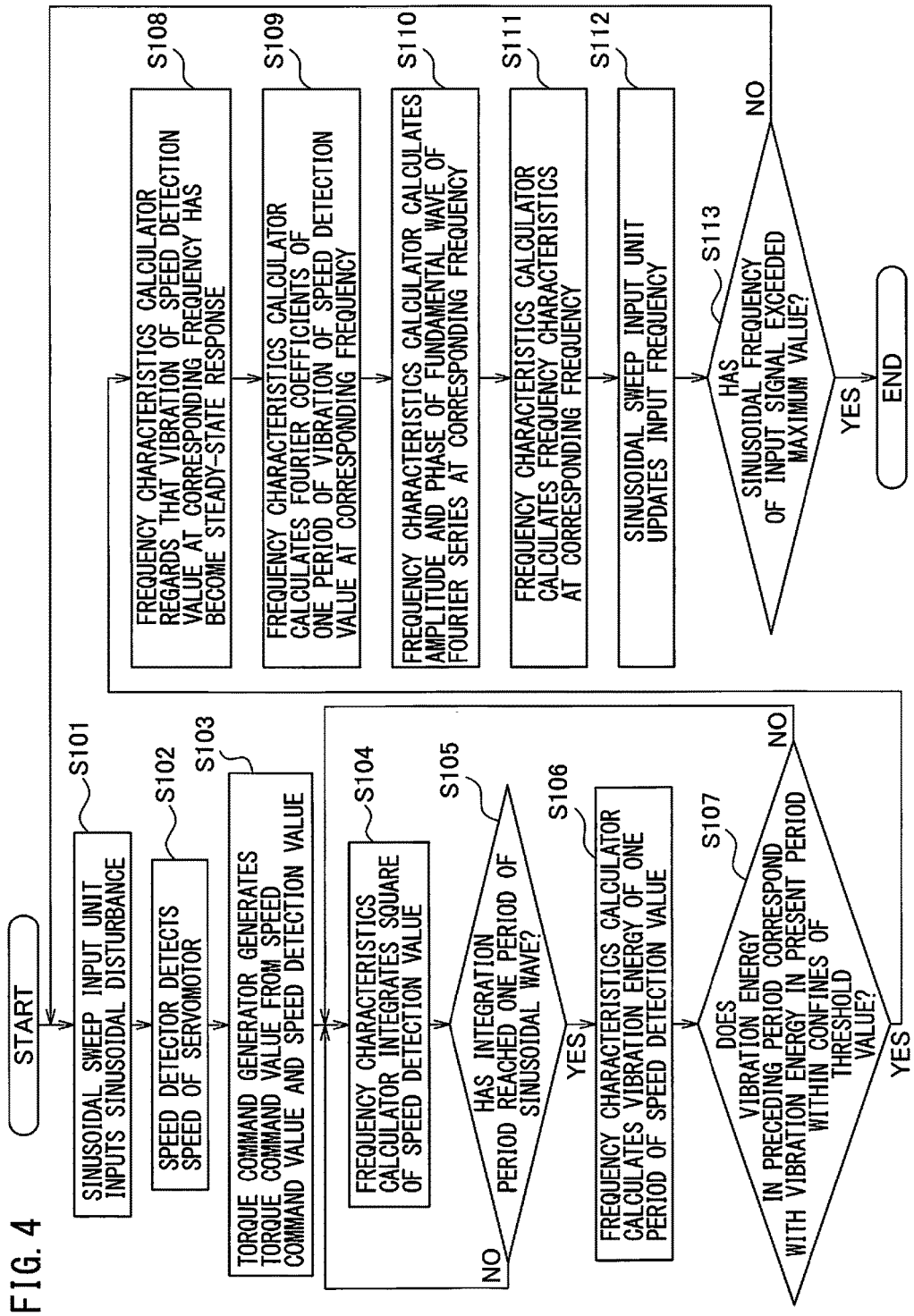
FIG. 4 is a flowchart that explains the operation process of the servo control apparatus according to the embodiment of the present invention.

Next, the operation process of the servo control apparatus according to the embodiment of the present invention will be described with reference to a flowchart shown in FIG. 4. First, in step S101, the sinusoidal sweep input unit 5 (see FIG. 1) inputs a sinusoidal disturbance to the speed control loop 4. After that, in step S102, the speed detector 3 detects the speed of the servomotor 20.

After that, in step S103, the torque command generator 2 generates a torque command value from a speed command value and a speed detection value. After that, in step S104, the frequency characteristics calculator 6 integrates the square of the speed detection value detected by the speed detector 3.

After that, in step S105, whether or not an integration period has reached one period of the sinusoidal wave is determined. When the integration period has not reached one period of the sinusoidal wave, the operation goes back to step S104, and the frequency characteristics calculator 6 continues integrating the square of the speed detection value.

On the other hand, when the integration period has reached one period of the sinusoidal wave, in step S106, the frequency characteristics calculator 6 calculates the vibration energy $E_{n+1}$ of one period of the speed detection value. After that, in step S107, it is determined whether or not vibration energy $E_n$ in the preceding period corresponds with the vibration energy $E_{n+1}$ in the present period within the confines of a threshold value. When the vibration energy $E_n$ in the preceding period does not correspond with the vibration energy $E_{n+1}$ in the present period within the confines of the threshold value ("steady-state determination threshold value"), the operation goes back to step S104, and the frequency characteristics calculator 6 continues integrating the square of the speed detection value.

On the other hand, when the vibration energy $E_n$ in the preceding period corresponds with the vibration energy $E_{n+1}$ in the present period within the confines of the threshold value, in step S108, the frequency characteristics calculator 6 regards that the vibration of the speed detection value at a corresponding frequency has become a steady-state response. After that, in step S109, the frequency characteristics calculator 6 calculates Fourier coefficients $a_n$ and $b_n$ of one period of the vibration of the speed detection value at the corresponding frequency.

After that, in step S110, the frequency characteristics calculator 6 calculates the amplitude $c_1$ and phase $\theta_1$ of a fundamental wave of the Fourier series at the corresponding frequency. After that, in step S111, the frequency characteristics calculator 6 calculates frequency characteristics at the corresponding frequency.

After that, in step S112, the sinusoidal sweep input unit 5 updates an input frequency. After that, in step S113, it is determined whether or not the sinusoidal frequency of an input signal has exceeded a maximum value. When the sinusoidal frequency of the input signal has exceeded the maximum value, the sequential operation is completed. On the other hand, when the sinusoidal frequency of the input signal has not exceeded the maximum value, the operation goes back to step S101, and the sequential operation is restarted.

As described above, according to the servo control apparatus of the embodiment of the present invention, it is possible to provide a servo control apparatus having the function of precisely obtaining the frequency characteristics of the feed axis in real time online by a vibration test that is easily performed using a motor attached to the feed axis.

The present invention has high significance in the following three terms, with respect to conventional technologies.

1. A control loop structure for a feed axis is provided, and the output of the loop is expressed as the Fourier series having an arbitrary number of terms. Although the Fourier transform is not based on the assumption of the periodicity of objects, the Fourier series is usable only for periodic signals. When applying a frequency sweep, a signal is determined to be a periodic signal, so that it is possible to measure frequency characteristics from a fundamental component of the Fourier series (the invention according to claim 1).

2. Since the original meaning of the frequency characteristics is the amplitude and phase difference of a steady-state vibration, it is preferable to make sure of the establishment of a steady state. To verify a convergence of a vibration to the steady state, the energy of the vibration is calculated on a periodic basis. The vibration continues to be applied at a constant frequency until the convergence to the steady state is established, thus improving a measurement precision (the invention according to claim 2).

3. Nonlinearity does not directly manifest itself in the frequency characteristics even with the use of the Fourier transform. However, by calculating the Fourier series at each frequency and comparing the amplitude of a fundamental component with the amplitude of a harmonic component, it is possible to quantitatively evaluate the nonlinearity at each frequency (the invention according to claim 3).

According to the servo control apparatus of the embodiment of the present invention, it is possible to obtain the frequency characteristics of the feed axis with high precision in real time by the vibration test that is easily performed using the motor attached to the feed axis.

What is claimed is:

1. A servo control apparatus that is a control apparatus for a machine tool having a feed axis driven by a servomotor comprising:

a speed command generator for generating a speed command value for the servomotor;

a torque command generator for generating a torque command value for the servomotor;

a speed detector for detecting the speed of the servomotor;

a speed control loop including the speed command generator, the torque command generator, and the speed detector;

a sinusoidal sweep input unit for performing a sinusoidal sweep on the speed control loop; and a frequency characteristics calculator for estimating the gain and phase of speed control loop input and output signals from the output of the speed control loop when a sinusoidal disturbance is inputted to the speed control loop of the control device, wherein the frequency characteristics calculator expresses the output of the speed control loop as the Fourier series having an arbitrary number of terms using a disturbance input frequency from the sinusoidal sweep input unit as a fundamental frequency, and calculates the amplitude and phase of a fundamental component of the Fourier series in order to calculate frequency characteristics on line, wherein the frequency characteristics calculator verifies a convergence of the output of the speed control loop to a steady state by monitoring energy of one period of a sinusoidal wave on a periodic basis, and the sinusoidal sweep input unit continues inputting the sinusoidal wave at a constant frequency, until the frequency characteristics calculator determines that the output of the speed control loop has reached the steady state.

2. A servo control apparatus that is a control apparatus for a machine tool having a feed axis driven by a servomotor comprising:
- a speed command generator for generating a speed command value for the servomotor;
- a torque command generator for generating a torque command value for the servomotor;
- a speed detector for detecting the speed of the servomotor;
- a speed control loop including the speed command generator, the torque command generator, and the speed detector;
- a sinusoidal sweep input unit for performing a sinusoidal sweep on the speed control loop; and
- a frequency characteristics calculator for estimating the gain and phase of speed control loop input and output signals from the output of the speed control loop when a sinusoidal disturbance is inputted to the speed control loop of the control device, wherein the frequency characteristics calculator expresses the output of the speed control loop as the Fourier series having an arbitrary number of terms using a disturbance input frequency from the sinusoidal sweep input unit as a fundamental frequency, and calculates the amplitude and phase of a fundamental component of the Fourier series in order to calculate frequency characteristics on line, wherein the frequency characteristics calculator expresses the output of the speed control loop as the Fourier series having a harmonic component corresponding to the disturbance input frequency, and evaluates the nonlinearity of a control system by a characteristic that is the ratio of the contained harmonic component to the fundamental component.

* * * * *